UNITED STATES PATENT OFFICE.

PHILIPP SIEDLER AND KURT HENKE, OF GRIESHEIM-ON-THE-MAIN, GERMANY, ASSIGNORS TO CHEMISCHE FABRIK GRIESHEIM-ELEKTRON, OF FRANKFORT-ON-THE-MAIN, GERMANY, A CORPORATION OF GERMANY.

PROCESS OF REPLACING CARBON MONOXID IN A GASEOUS MIXTURE BY HYDROGEN.

1,181,264.  Specification of Letters Patent.  Patented May 2, 1916.

No Drawing.  Application filed June 13, 1912.  Serial No. 703,538.

*To all whom it may concern:*

Be it known that we, PHILIPP SIEDLER and KURT HENKE, both subjects of the Emperor of Germany, and residents of Griesheim-on-the-Main, Germany, have invented certain new and useful Improvements in the Process of Replacing Carbon Monoxid in a Gaseous Mixture by Hydrogen, of which the following is a specification.

It is known that carbon monoxid can be removed from gases containing it and replaced by an equal volume of hydrogen by passing the gases mixed with steam over calcium hydroxid, or calcium oxid, (see U. S. A. Patent 989,955, British Patent No. 2523, A. D. 1909, and French Patent No. 409,506). It has also been proposed to employ a similar process for the production of hydrogen by decomposing slaked lime with coal thus combining the water gas and hydrogen process in one apparatus. All such processes have however the defect that the regeneration of the lime is difficult, owing to the lime being used in the form of powder, which must be the case when slaked lime is employed. As a cubic meter of hydrogen necessitates the use of practically from two to three kilograms of CaO, in a short time great waste heaps accumulate and the consumption of lime compared with the production of hydrogen becomes a very serious and expensive item. In addition to this, working with lime dust results in much lime being carried off in the form of light dust by the gases and this gives rise to frequent breakdowns of the plant.

We have found that if lime in pieces be used, all these disadvantages are obviated. To effect the replacement of the carbon monoxid by hydrogen the gases containing carbon monoxid mixed with steam are passed over the pieces of lime at temperatures between 400° and 750° centigrade.

The chemical action due to operating with lime in pieces was not to be foreseen as it was natural to assume that the lime would become coated superficially with calcium carbonate and that this coating (which must have the original density and constitution of lime stone) would prevent the core from absorbing carbon monoxid. We have found however that the lime reacts throughout rapidly and with perfect uniformity and that even toward the end of the reaction the content of carbonate is greater inside of large pieces of lime than it is at the surface thereof. The reaction carried out by this process is a reversible reaction $CO + H_2O \rightleftharpoons CO_2 + H_2$.

The use of lime in pieces has the further advantage that the process can be carried out in an economical manner in vertical vessels, or towers. It has been found that with horizontal, or slightly inclined, layers of lime, the amount of gas which can be treated is only about 50 per cent. of that which can be dealt with in vertical vessels, or towers. The cause of this is that during the operation with horizontal, or slightly inclined, layers, there is a stage in which shrinkage of the charge affords a passage for the gases which they follow without coming into the required intimate contact with the whole of the lime. The employment of vertical vessels, or towers, necessitates the use of lime in pieces because lime in the form of powder would offer enormous and prohibitive resistance to the gases. Moreover, by employing lime in pieces, the economical regeneration of the lime is possible without difficulty. The regeneration can be effected by emptying the vessels, or towers; after the carbonation of the lime and revivifying the carbonated lime into CaO, which may be done in ordinary burning kilns; or the vessels, or towers, in which the lime has become inactive can be switched out and heated from outside, or from inside to a higher temperature inside, and if desired ventilated, or quenched, the gases being allowed to pass through fresh vessels, or towers. After the vessels, or towers, have cooled, they can again be switched in for use in the process.

In accordance with this invention it is possible to obtain not only pure hydrogen from water gas, but also mixtures of hydrogen and other gas, or gases, for instance nitrogen from gaseous mixtures which contain, in addition to carbon monoxid, the corresponding components. In the same way it is possible to remove carbon monoxid from illuminating gas.

We claim:

1. The process of replacing by hydrogen the carbon monoxid in a gaseous mixture containing the same which comprise passing the gaseous mixture together with steam at a temperature of from 400° to 750° centigrade over caustic lime in the form of lumps at such temperature as is caused and maintained by the heat of the gaseous mixture and the heat of the reaction between said lime and said mixture.

2. The process of replacing by hydrogen the carbon monoxid in a gaseous mixture containing the same which comprises passing the gaseous mixture together with steam at a temperature of from 400° to 750° C. vertically over caustic lime in the form of lumps superposed on each other in vertical towers, the temperature of said lime being caused and maintained by the heat of the gaseous mixture and the heat of the reaction between said lime and said mixture.

In testimony whereof we have signed our names to this specification in the presence of two subscribing witnesses.

PHILIPP SIEDLER.
KURT HENKE.

Witnesses:
FRANZ HASSLAGHAR,
ERNST JOSEF WESTHOFEN.